May 16, 1933.   R. A. HARRIS   1,908,756
MEANS FOR FEEDING PLASTIC TOFFEE AND OTHER MATERIAL TO WRAPPING MACHINES
Filed Jan. 20, 1933   3 Sheets-Sheet 1

May 16, 1933.  R. A. HARRIS  1,908,756
MEANS FOR FEEDING PLASTIC TOFFEE AND OTHER MATERIAL TO WRAPPING MACHINES
Filed Jan. 20, 1933   3 Sheets-Sheet 2
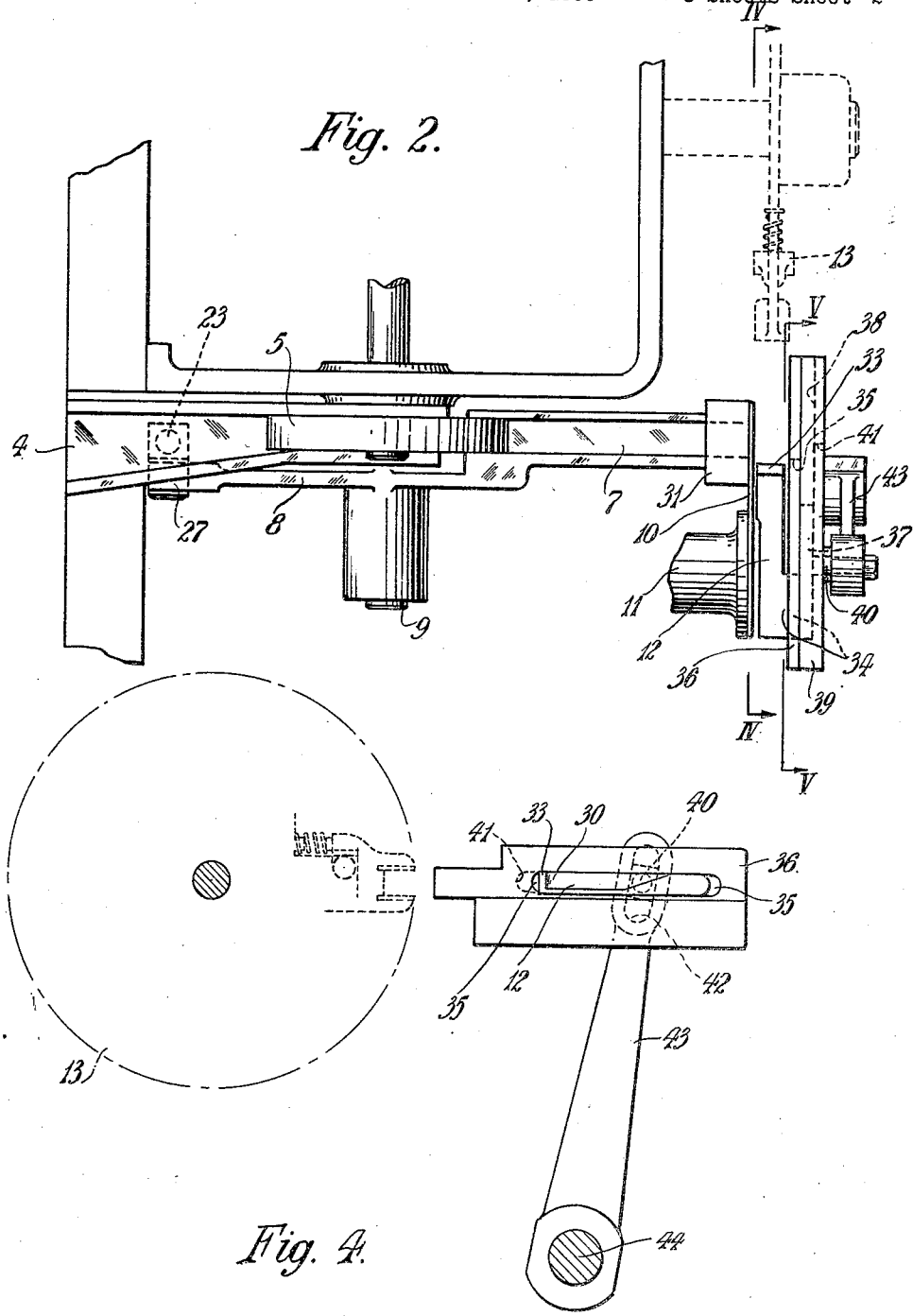

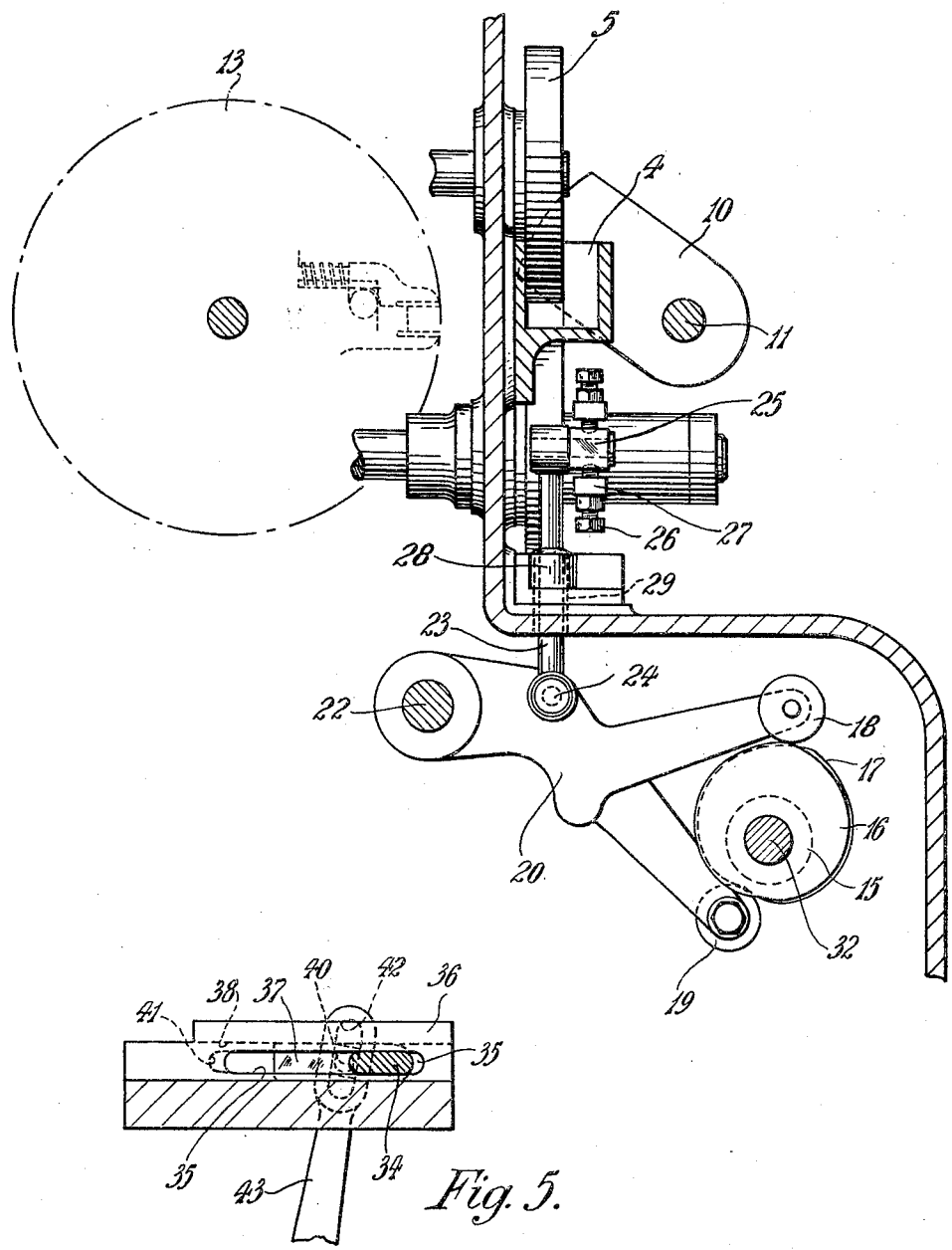

Patented May 16, 1933

1,908,756

UNITED STATES PATENT OFFICE

RICHARD ANSON HARRIS, OF LEEDS, ENGLAND, ASSIGNOR TO THE FORGROVE MACHINERY COMPANY LIMITED, OF LEEDS, ENGLAND

MEANS FOR FEEDING PLASTIC TOFFEE AND OTHER MATERIAL TO WRAPPING MACHINES

Application filed January 20, 1933, Serial No. 652,761, and in Great Britain December 14, 1931.

This invention is for improvements in means for feeding toffee and other material in plastic form to wrapping machines, and relates more particularly to apparatus for severing a rope or bar (hereinafter termed "rope" for convenience) of plastic toffee or similar material of the type comprising a guide (preferably of trough formation), feeding mechanism for feeding the toffee along the guide to a cutting station, a knife located at the cutting station and arranged for intermittent cutting operation to sever in succession a series of pieces from the end of the rope of toffee, and a reciprocating pusher arranged for movement, co-ordinated with the operation of the knife, along a path transverse to the line of feed of the toffee, to deliver in succession the severed pieces of toffee to a wrapping machine.

In apparatus of this kind, as hitherto proposed, it has been necessary to employ an intermittent feeding mechanism for the toffee, in order to allow the pusher to cross the line of feed of the toffee during the operation of transferring the severed piece of toffee to the wrapping machine. This, however, renders the operation of the apparatus slow and inefficient, and the object of the present invention is to improve the efficiency and speed of operation of severing apparatus of the above described type by providing an apparatus in which the toffee can be continuously fed without interference with the pusher.

The invention accordingly provides an apparatus of the above described type for severing a rope of plastic toffee or similar material, which is characterized by the provision of mechanism for displacing the guide during movement of the pusher in order to avoid interference between the rope of toffee and the pusher, said mechanism returning the guide to bring the rope into the path of the pusher on return of the pusher, when the latter is no longer in a position to interfere with the feed of the rope along its normal line. The rope may be displaced from its normal line of feed before the pusher has had time to cross this line on its forward stroke, and it is only returned to its normal line of feed after the pusher has cleared this line in its return stroke.

According to a feature of the invention, the mechanism for displacing the toffee from its normal line of feed may comprise a pivoted lever carrying the guide trough for the toffee and arranged to be oscillated about its pivot in synchronism with the reciprocation of the pusher.

According to a further feature of the invention the feeding mechanism for the toffee rope may comprise a pair of continuously rotating sizing rollers. It is, however, understood that the invention is not limited to the employment of continuously rotating sizing rollers, although one of its main advantages is that it permits of the employment of a continuous feeding mechanism for the toffee. The apparatus according to the invention may be employed in conjunction with an intermittent feeding mechanism, in which case it enables a greater speed of operation to be obtained than in the previously known constructions in which the rope of toffee was not displaced out of the path of the pusher during reciprocation thereof.

According to a further feature of the invention the guide trough may be provided with a bridge along a part at least of its length, for the purpose of ensuring that the toffee will resume its normal line of feed on return of the guide trough from its displaced to its normal position. Moreover, the side of the pusher nearest the knife may be cut away in order to avoid interference between the toffee and the pusher at the commencement of the movement of the toffee rope out of the path of the pusher.

A particular embodiment of severing apparatus according to the invention will now be described in detail with reference to the accompanying drawings, in which:—

Fig. 2 is a plan view.

Fig. 3 is a section on the line III—III in Fig. 1.

Fig. 4 is a section on the line IV—IV in Fig. 2.

Fig. 5 is a section on the line V—V in Fig. 2.

Figure 1:
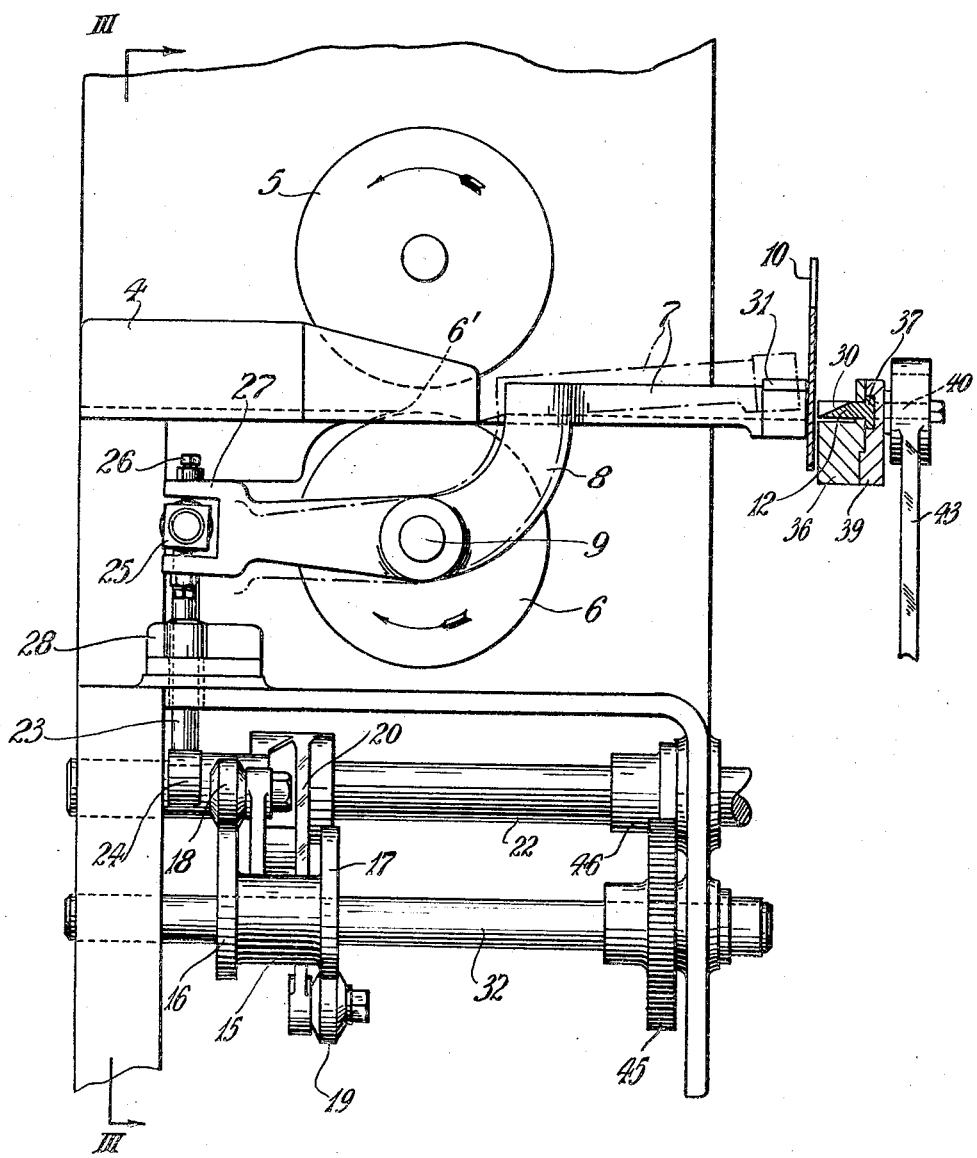
Fig. 1 is a side elevation of the apparatus partly in section.

The apparatus comprises a feed chute 4 along which a rope of plastic toffee or similar material is delivered by means of the continuously rotating sizing rollers 5, 6, the lower roller 6 projecting through a slot 6' in the base of the chute. The toffee is delivered from the chute 4 into a guide trough 7 carried on the bell crank lever 8, which is pivotally mounted at 9. In its normal position the guide trough 7 is in line with the chute 4. At the end of the guide trough 7 is disposed a rotary knife 10 which is rotatably mounted on a shaft 11 (Fig. 2) and is driven by gearing (not shown) from suitable driving mechanism, coordinated with the mechanism for reciprocating the pusher to be hereinafter described, so as to effect an intermittent cutting operation to sever a piece of toffee from the end of the rope.

A pusher 12 is provided which is arranged to be reciprocated, by mechanism to be hereinafter described, in a direction transverse to the line of feed of the toffee, for the purpose of delivering each piece of toffee, as it is severed from the rope, to the pocket wheel 13 of the wrapping machine.

It will be appreciated that early in its stroke the pusher 12 will cross the line of feed of the toffee. Accordingly, mechanism is provided for raising the guide trough 7 at or shortly after the commencement of the stroke of the pusher in order to avoid interference between the toffee and the pusher as the toffee is fed forward ready for the next cutting operation. This mechanism comprises a cam 15 (Fig. 1) provided with two cam faces 16 and 17 which co-operate respectively with the cam followers 18, 19 carried on the forked lever 20. The cam 15, which is mounted on the shaft 32, is driven synchronously with the mechanism for reciprocating the pusher, and the effect of the cam is to oscillate the forked lever 20 about its pivot 22. It will, of course, be appreciated that one cam face only need be provided on the cam 15, provided a spring or equivalent means is supplied for maintaining the cam follower in engagement with the cam. The construction shown in the drawings, however, avoids the necessity of providing any auxiliary mechanism, such as a spring, for maintaining the cam follower and cam in engagement with one another.

The oscillatory movement of the forked lever 20 is communicated to the bell crank lever 8 by means of the link 23, which is pivoted at its lower end by a pivot 24 to the forked lever 20 and which carries at its upper end a hardened steel block 25, which is adjustably held between studs 26 in the forked end 27 of the bell crank lever 8.

The necessary freedom of movement at the ends of the link 23 to allow of the arcuate movements in different planes imparted to this by the levers 20 and 8, is obtained by permitting slight oscillation to take place between the steel block 25 and the studs 26 at the upper end of the link, and by allowing of slight freedom of movement in the pivot 24 at the lower end of the link 23. The block 28 on the frame of the machine is cut away at 29 to allow of the necessary freedom of movement of the link itself.

It will be appreciated, therefore, that the effect of the cam is to cause the guide trough 7 to be oscillated from its normal position indicated in full lines in Fig. 1, to its raised position indicated in dotted lines, in which the rope of toffee is fed forward clear of the pusher. The pusher is provided with a rectangular leading part 33 but behind this it is cut away from the side facing the knife, as indicated at 30, in order to avoid interference between the oncoming rope of toffee and the pusher at the commencement of the movement of the toffee rope out of the path of the pusher.

The guide trough 7 is provided with a bridge piece 31 for ensuring that the toffee shall be brought down again into its normal line of feed when the guide trough returns to its normal position ready for the severing operation. If no such bridge piece were provided there would be a likelihood of the plastic toffee remaining in its raised position clear of the guide trough, and continuing to be fed forward along a line of feed which does not intersect the path of the pusher.

The pusher 12 is provided with a cranked end 34 extending through a slot 35 in a part 36 of a guide frame. The cranked end 34 is fixed to a slide 37 which is slidably mounted in a recess 38 in another part 39 of said guide frame, said slide 37 having a projection 40 which extends through a slot 41 in the part 39 and is mounted in an elongated slot 42 in the end of an arm 43. The arm 43 is rockably mounted on a shaft 44 under the actuation of cams (not shown) on the driving mechanism, so that reciprocation of said pusher is coordinated with the mechanism for rotating the knife and with the feed mechanism for the rope of toffee.

The shaft 32 is provided with a gear wheel 45 by which it is driven from a suitable source of power (not shown), while the shaft 22 on which the lever 20 is rockably mounted is provided with a stop 46 to prevent axial movement thereof.

With the above described apparatus the rope of toffee can be so continuously fed that when this rope is returned into its normal path a required length of toffee will project from the guide trough so that the subsequent severing and feeding operations take place without interruption.

What I claim as my invention and desire to secure by Letters Patent is:—

1. Apparatus for severing a rope of plastic toffee and similar material, comprising a guide for supporting the rope of the plastic material, feed mechanism for feeding the rope along said guide, means at the end of the guide for intermittently severing in succession a series of pieces from the end of said rope, a pusher for the severed pieces arranged to move transversely of the rope, and means for displacing the guide during movement of the pusher in order to avoid interference between the rope of toffee and the pusher, said displacing means returning the guide to bring said rope into the path of the pusher on the return of the pusher.

2. Apparatus for severing a rope of plastic toffee and similar material, comprising a guide for supporting the rope of the plastic material, feed mechanism for feeding the rope along said guide, means at the end of the guide for intermittently severing in succession a series of pieces from the end of said rope, a pusher for the severed pieces arranged to move transversely of the rope, a pivoted lever carrying the guide and means for oscillating said lever about its pivot to cause it to displace the guide during movement of the pusher in order to avoid interference between the rope of toffee and the pusher, and to return the guide to bring said rope into the path of the pusher on the return of the pusher.

3. Apparatus for severing a rope of plastic toffee and similar material, comprising a guide for supporting the rope of the plastic material, feed mechanism for feeding the rope along said guide, means at the end of the guide for intermittently severing in succession a series of pieces from the end of said rope, a pusher arranged to move transversely of the rope in order to remove the pieces as severed out of the path of the rope, a pivoted lever carrying said guide, a cam having a pair of cam faces, cam followers on said pivoted lever, said cams and cam followers being so arranged as positively to oscillate said lever in both directions and cause the guide to be displaced during movement of the pusher in order to avoid interference between the rope of toffee and the pusher, and also to return the guide to bring said rope into the path of the pusher on the return of the pusher.

4. Apparatus for severing a rope of plastic toffee and similar material, comprising a guide for supporting the rope of the plastic material, continuous feed mechanism for feeding the rope uninterruptedly along said guide, means intermittently moving across the end of the guide for severing pieces from the end of said rope, a pusher arranged to move transversely of the rope in coordination with said means for severing the pieces, and means for displacing the guide during movement of the pusher in order to avoid interference between the rope of toffee and the pusher, said displacing means returning the guide to bring said rope into the path of the pusher on the return of the pusher.

5. Apparatus for severing a rope of plastic toffee and similar material, comprising a guide trough for supporting the rope of the plastic material having a bridge at its end, feed mechanism for feeding the rope along said guide, means at the end of the guide for intermittently severing in succession a series of pieces from the end of said rope, a pusher for the severed pieces arranged to move transversely of the rope, and means for displacing the guide during movement of the pusher in order to avoid interference between the rope of toffee and the pusher, said displacing means returning the guide to cause said bridge positively to force the rope into the path of the pusher on the return of the pusher.

6. Apparatus for severing a rope of plastic toffee and similar material, comprising a guide for supporting the rope of the plastic material, feed mechanism for feeding the rope along said guide, means at the end of the guide for intermittently severing in succession a series of pieces from the end of said rope, a pusher arranged to move transversely of the rope for displacing said pieces as severed clear of said rope, and means for displacing the guide during movement of the pusher in order to avoid interference between the rope of toffee and the pusher and for returning the guide to bring said rope into the path of the pusher on the return of the pusher, said pusher being cut away so as to avoid interference between the rope and the pusher at the commencement of the movement of the guide.

7. In means for feeding plastic toffee and similar material, the combination of, means for feeding a rope of said material, a guide for supporting the rope fed from said feeding means, severing means at the end of said guide adapted intermittently to sever lengths of said rope to form pieces, a reciprocating pusher arranged to move to and fro transversely across the direction of feed of said rope and thereby move the pieces as severed out of the path of the feed of the rope so as to make room for another length of rope to form the next piece, and mechanism for displacing said guide during each reciprocation of the pusher in order to avoid interference between the pusher and the rope fed along the guide.

8. In means for feeding plastic toffee and similar material, the combination of, continuous feeding means for a rope of said material, a guide for supporting the rope fed from said feeding means, severing means at the end of said guide adapted intermittently to sever lengths of said rope to form pieces, a reciprocating pusher arranged to move to and fro transversely across the direction of feed of said rope and thereby move the pieces as severed out of the path of the feed of the rope so as to make room for another length of rope to form the next piece, a lever carrying said guide, and means for oscillating said lever to displace the guide during each reciprocation of the pusher in order to avoid interference between the pusher and the rope continuously fed along the guide.

9. In means for feeding plastic toffee and similar material, the combination of, continuously rotating sizing rollers for feeding a rope of said material, a guide for supporting the rope fed from said rollers, a rotating knife arranged intermittently to cross the end of said guide adapted to sever lengths of said rope to form pieces, a reciprocating pusher on the opposite side of the knife to the guide arranged to move transversely of said rope and to push said pieces as severed out of the path of the feed of the rope so as to make room for another length of rope to form the next piece, a lever carrying said guide, and means for oscillating said lever to displace the guide at the beginning of each forward movement of the pusher and to return said guide at the end of the return movement of said pusher in order to avoid interference between the pusher and the rope fed along the guide, said pusher being cut away at the side adjacent to the knife so as to avoid interference between the pusher and the rope while the guide is being displaced at the beginning of the forward movement of the pusher.

In witness whereof I have hereunto set my hand.

RICHARD ANSON HARRIS.